United States Patent [19]

Lin

[11] Patent Number: 4,568,405

[45] Date of Patent: Feb. 4, 1986

[54] REACTIVE PLASTISOL DISPERSION ADHESIVE AND BONDING METHOD EMPLOYING SAME

[75] Inventor: Shiow-Ching Lin, Columbia, Md.

[73] Assignee: W. R. Grace & Co., New York, N.Y.

[21] Appl. No.: 590,461

[22] Filed: Mar. 16, 1984

Related U.S. Application Data

[62] Division of Ser. No. 493,035, May 9, 1983, Pat. No. 4,463,128.

[51] Int. Cl.$^4$ .............................................. C09J 5/02
[52] U.S. Cl. .............................. 156/307.3; 156/275.5; 156/275.7; 156/327; 428/524
[58] Field of Search .................... 428/524; 525/58, 59; 156/275.5, 275.7, 307.3, 327

[56] References Cited

U.S. PATENT DOCUMENTS

| | | | |
|---|---|---|---|
| 2,819,248 | 1/1958 | Casebolt | 525/58 |
| 3,133,825 | 5/1964 | Rubens | 156/275.5 |
| 3,484,339 | 12/1969 | Caldwell | 525/58 |

FOREIGN PATENT DOCUMENTS

| | | | |
|---|---|---|---|
| 2448561 | 10/1980 | France | 156/327 |
| 1130026 | 10/1968 | United Kingdom | 525/59 |

*Primary Examiner*—John J. Gallagher
*Attorney, Agent, or Firm*—Richard P. Plunkett; William W. McDowell, Jr.

[57] ABSTRACT

This invention relates to a reactive plastisol dispersion comprising
(1) a polyvinyl acetal thermoplast in particle form;
(2) a liquid plasticizer member of the group consisting of
  (a) at least one an ethylenically unsaturated monomer, oligomer or prepolymer of the formula:

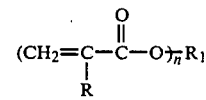

wherein R is H or $CH_3$, $R_1$ is an organic moiety and n is 1 or more,
  (b) at least one unsaturated polyester containing the group:

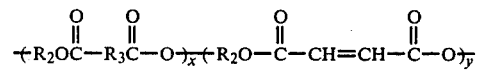

wherein $R_2$ and $R_3$ are organic moieties, x is 0–20 and y is 1–20; and
  (c) a mixture of (a) and (b); and, optionally, either
(3) a free radical thermal initiator or
(4) a photoinitiator for crosslinking. The reactive plastisol dispersion when fluxed can be useful as a sealant or adhesive.

8 Claims, No Drawings

REACTIVE PLASTISOL DISPERSION ADHESIVE AND BONDING METHOD EMPLOYING SAME

This is a division, of application Ser. No. 493,035, filed May 9, 1983, now U.S. Pat. No. 4,463,128.

BACKGROUND OF THE INVENTION

1. Field of the Invention

This invention relates to a thermosettable adhesive or sealant plastisol dispersion composition which, on heating at or above the fluxing temperature, rapidly provides handling strength and can be crosslinked to give a thermoset seal or bond by heat or UV radiation.

The invention also relates to a process for forming a crosslinked, bond or seal.

2. Description of the Prior Art

Conventional plastisol compositions are made up of finely divided thermoplastic resin particles in a liquid, non-volatile plasticizer in which the resin is insoluble at room temperature. On elevating the temperature of the composition, the resin particles are substantially completely plasticized by the plasticizer producing a homogeneous solid solution which is a rubbery, thermoplastic gel.

The only widely used resin in plastisol compositions has been polyvinyl chloride because of certain inherent characteristics. Vinyl chloride resins produced either by bulk, suspension or aqueous emulsion polymerization or mixtures thereof have been found to be particularly advantageous in such compositions. Vinyl chloride resins produced by aqueous emulsion polymerization, because of their excellent stir-in properties which permit easy dispersion in a liquid plasticizer up to a high concentration of the resin at room temperature to form paste like mixtures, have been found useful in many applications.

However, vinyl chloride resins whether produced by bulk, suspension or by emulsion polymerization, have certain drawbacks. Vinyl chloride resin decomposes upon heating in processing, releases corrosive hydrogen chloride and, ultimately, results in the discoloration and deterioration of fabricated polymer properties. A problem recently noted in regard to polyvinyl chloride is the possible carcinomatous effect these polymers may have on the human body due to possibly residual vinyl chloride monomer being present in the polymer. In light of the above, there has been a recent search for materials which can be substituted for polyvinyl chloride in various end uses.

The conventional plastisols after plasticization normally have low heat resistance resulting from the plasticization which reduces the heat deflection temperature of the polymers. To improve the heat resistance, reactive plasticizers such as diacrylates (Dainippon Ink and Chemical JP 80 52,335) and epoxy resins (Dunlop, JP 81 00841) were mixed with conventional plasticizers to provide crosslinks after curing the fluxed plastisol.

In general, a thermoset is based on two reactive ingredients separated physically as two packages. This separation leads to the problems of non-uniform mixing and inaccurate metering in application. Furthermore, the materials, after mixing, have to be used in a very short period to prevent gellation caused by the crosslinking reaction. This creates difficulties such as pot life, quality control and the economic concerns of a two-package thermoset system.

To prepare a one package thermoset, technology such as chemical blocking of the reactive group was developed. Unfortunately, the available one package systems suffer from short shelf life and reduced curing speed. A solution to this problem is to prepare reactive plastisols which rapidly turn to a flexible or rubbery solid upon heating at a temperature above the fluxing point to provide handling mechanical strength and cure to a wholly crosslinked thermoset at the same or more elevated temperature after fluxing. In these materials the plasticizer for the thermoplast contains functional groups which in the presence of latent thermal curing agents allow the plasticizer to cure on heating. One example of such a system is set out in U.S. Pat. No. 4,020,966. Therein a liquid epoxide plasticizer and a resin component comprising a copolymer of a normal alpha-olefin and maleic anhydride are admixed at room temperature and heated to an elevated temperature, e.g., 200° C., resulting in a fluxed, thermoset product.

OBJECTS OF THE INVENTION

One object of the instant invention is to produce a novel process and composition. Another object of the instant invention is to produce a plastisol composition which is useful as an adhesive or sealant. Yet another object of the instant invention is to produce a plastisol composition which on curing substantially minimizes or precludes exuding or extraction of the plasticizer. Still another object of the invention is to produce a plastisol composition which on heating to the fluxing temperature acquires handling strength and cures to a thermoset at or above said fluxing temperature. Yet another object of the invention is to produce a reactive, fluxed plastisol curable to a thermoset material on exposure to UV or high energy radiation Other objects will become apparent from a reading hereinafter.

DESCRIPTION OF THE INVENTION

This invention relates to a reactive plastisol dispersion comprising (1) a polyvinyl acetal thermoplast in particle form;

(2) a liquid plasticizer member of the group consisting of (a) at least one an ethylenically unsaturated monomer, oligomer or prepolymer of the formula:

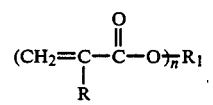

wherein R is H or CH$_3$, R$_1$ is an organic moiety and n is 1 or more, (b) at least one unsaturated polyester containing the group:

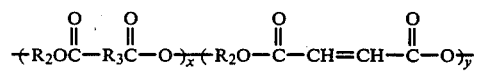

wherein R$_2$ and R$_3$ are organic moieties, x is 0–20 and y is 1–20; and (c) a mixture of (a) and (b); and, optionally, either (3) a free radical thermal initiator or (4) a photoinitiator for crosslinking. The reactive plastisol dispersion when fluxed can be used as a sealant or adhesive.

The plastisol of the invention operates in the same method as conventional plastisols. That is, herein the term "plastisol" refers to dispersions of finely divided thermoplastic resin particles in a liquid non-volatile plasticizer in which the resin is insoluble and cannot be swollen by the plasticizer at room temperature. However, at elevated temperatures, the resin fluxes, i.e., is substantially completely plasticized by the plasticizer so that a homogeneous, solid solution is obtained which forms a rubbery thermoplastic mass. At this point the plastisol has handling or mechanical strength. Further heating at or above the fluxing temperature or exposure to UV or high energy ionizing radiation results in a thermoset material with ultimate structural strength. If only the plasticizer is reactive, it will crosslink to a thermoset and form a semi-interpenatrating network. If the reactive plasticizer reacts with the thermoplast, a crosslinked material results. In addition to the resin thermoplast and the plasticizer, the formulation may also contain latent curing agents, electrically conductive particles, fillers, pigments, stabilizers and various conventional compound ingredients.

The plastisol compositions herein are formed by admixture of 100 parts by weight of the resin particles with about 50 to 2,000 parts by weight of a plasticizer per 100 parts of resin and, when necessary, 0.5 to 20 parts by weight of a latent free radical thermal initiator or 0.0005 to 30 parts by weight of a photoinitiator. Thereafter, the pasty plastisol admixture is heated at a temperature at or above the fluxing temperature which is lower than the melting point of the thermoplast resin for a time sufficient to plasticize the resin by the plasticizer to obtain a homogeneous, solid solution which is a rubbery mass. Additionally, it is also possible to heat the plastisol composition above the melting point of the resin and obtain a fluxed product. The fluxed product and pasty plastisol are both useful as adhesives or sealants. For example, the solid fluxed thermoplastic material can be placed between two adherends and heated at or above a temperature whereat either the thermal initiator decomposes and initiates curing of the plasticizer or the plasticizer, per se, initiates polymerization which results in a cured thermoset adhesive. The pasty plastisol can also be placed between two adherends and heated at or above the decomposition temperature of the initiator to flux and initiate the polymerization at the same time. Additionally, the solid, fluxed, thermoplastic material can be exposed to UV radiation to obtain a thermoset sealant or coating.

The polyvinyl acetals used as a thermoplast in the instant invention are prepared from aldehydes and polyvinyl alcohols. Polyvinyl alcohols are high molecular weights synthetic resins containing various percentages of hydroxyl and acetate groups produced by hydrolysis of polyvinyl acetate. Polyvinyl alcohols are usually classified as partially hydrolyzed (15-30% polyvinyl acetate groups) and completely hydrolyzed (0-5% acetate groups). Both types, in various molecular weight grades, are used in producing commercially available polyvinyl acetals.

The conditions of the acetal reaction and the concentration of the particular aldehyde and polyvinyl alcohol used are closely controlled to form polymers containing predetermined proportions of hydroxyl groups, acetate groups and acetal groups. The final product may be represented by the following stylized structure:

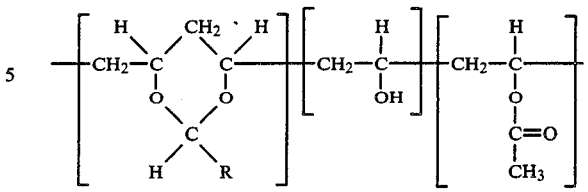

wherein R is H, $C_nH_{2n+1}$ wherein n is 1-10, unsaturated olefin or aryl groups.

The poly(vinyl acetals) may be made either from poly(vinyl alcohol) or directly from poly(vinyl acetate) without separating the alcohol. The two most widely used polyvinyl acetals are polyvinyl formal and polyvinyl butyral.

In the preparation of polyvinyl formal the direct process is normally used. That is, in a typical process, 100 parts of polyvinyl acetate are added to a mixture of 200 parts acetic acid and 70 parts water, which has been warmed to about 70° C. and stirred to complete solution. 60 parts 40% formalin and 4 parts of sulfuric acid (catalyst) are added and the reaction is carried out for 24 hours at 70° C. Water is added to the mixture with rapid agitation to precipitate the granules which are then washed free from acid and dried. Commercially available polyvinyl formal can have weight average molecular weights ranging from about 10,000 to about 40,000, a hydroxyl content expressed as percent polyvinyl alcohol ranging from 5.0 to 7.0, an acetate content expressed as percent polyvinyl acetate ranging from 9.5 to 30% and a formal content expressed as percent polyvinyl formal ranging from 68 to 82%.

In a typical process for forming polyvinyl butyral, 140 parts of fully hydrolyzed polyvinyl alcohol are suspended in 800 parts of ethanol. 80 parts of butyraldehyde and 8 parts of sulfuric acid are added and the reaction is carried out at about 80° C. for 5 to 6 hours. The solution of polyvinyl butyral is diluted with methanol and the polymer precipitated by the addition of water during vigorous agitation. The polymer is then stabilized, washed and dried. Commercially available polyvinyl butyrals have weight average molecular weights ranging from 30,000 to 270,000, a hydroxyl content ranging from 9 to 21%, an acetate content ranging from 0 to 2.5% and a butyral content ranging from 80 to 88%. Although these two polyvinyl acetates are the most widely used because of their commercial availability, other polyvinyl acetals such as polyvinyl propional, polyvinyl acetal and polyvinyl benzal are also operable herein. The polyvinyl acetal particles used herein have a particle size in the range from about 0.1 to about 1,500 microns.

In the instance when the reactive plasticizer is an acrylate, i.e., an acrylate terminated polyene of the formula:

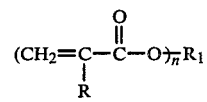

wherein R is H or $CH_3$, $R_1$ is an organic moiety and n is 1 or more, the compound can be made by various reactants and methods. One of these acrylate terminated materials is a polyether polyol urethane polyacrylate formed by reacting a polyether polyol with a polyisocyanate and end-capped with a hydroxyalkyl acrylate. Another material may be a polyester polyol urethane polyacrylate formed by reacting a polyester polyol with a polyisocyanate and end-capped with a hydroxyalkyl acrylate. Still another material in this category is an epoxy acrylate formed by reacting a diepoxide with acrylic acid. Acrylate or methacrylate ester of an epoxy resin used herein are commercially available materials. One of such materials is Shell Co.'s Epocryl Resin-370 having the idealized structure:

acrylate of tris(hydroxyethyl)-isocyanate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethyacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, dieth-

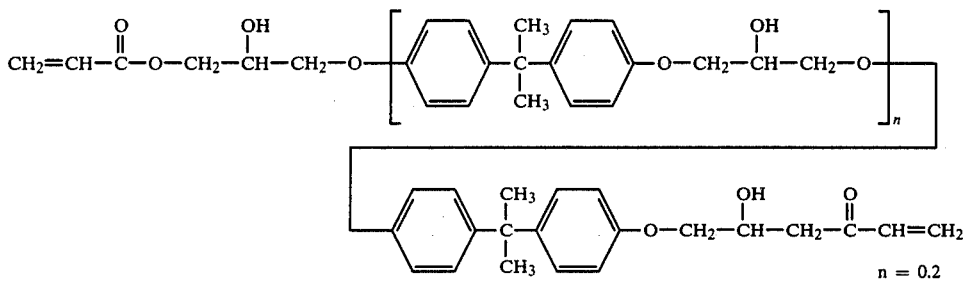

This material has a viscosity of 9,000 poises at 25° C. and contains 0.02 equivalents epoxide/100 g. The material is formed from the reaction of one mole of diglycidyl ether of bisphenol A reacted with two moles of acrylic acid.

Aside from substituted and unsubstituted acrylic acid being used to form the compound herein, hydroxyalkyl acrylate half esters of oxalic, malonic, succinic, glutaric, adipic, pimelic, suberic, azelaic, sebacic, phthalic, terephthalic, isophthalic acid and mixtures thereof are also operable. Thus, a generalized reaction for forming substituted or unsubstituted acrylate esters of an epoxy resin is as follows:

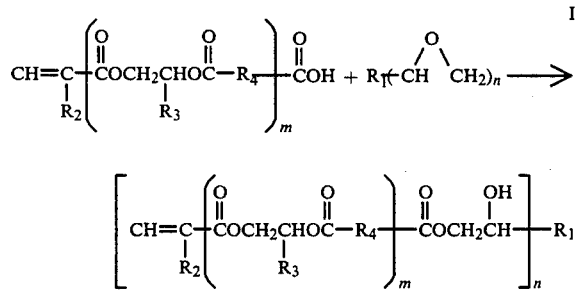

wherein m is 0 or 1; n is 1 to 4; $R_2$ and $R_3$ are H or $CH_3$; $R_4$ is —CH=CH—,

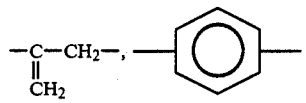

or —$(CH_2)_p$; p is 0 to 6 and $R_1$ is an organic moiety with the valence of n. Examples of acrylate terminated polyenes operable herein include, but are not limited to, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, di-trimethylol propane tetraacrylate, triylene glycol dimethacrylate, pentaerythritol tetramethacrylate, glycerin dimethacrylate, trimethylolpropane dimethacrylate, pentaerythritol trimethacrylate, pentaerythritol dimethacrylate and pentaerythritol diacrylate. Monoacrylates such as n-hexyl methacrylate, cyclohexyl methacrylate and tetrahydrofurfuryl methacrylate are also operable as reactive plasticizers herein. Mixtures of the acrylate terminated polyenes with each other or with the unsaturated polyester plasticizers of the instant invention are also operable in weight ratios of 1 to 99 to 99 to 1.

In the case where the reactive plasticizer is an unsaturated polyester, conventional unsaturated polyesters can be used, such as those described in Kirk-Othmer, Encyclopedia of Chemical Technology, 2nd Ed., Vol. 2, pp. 791–839, incorporated herein by reference. That is, conventional unsaturated polyesters operable herein are a class of soluble, linear, low molecular weight macromolecules which contain both carboxylic ester groups and carbon-carbon double bonds as recurring units along the main chain. These resins are usually prepared by condensation of (a) ethylenically unsaturated dicarboxylic acids or anhydrides to impart the unsaturation, (b) saturated dicarboxylic acids to modify the resin and (c) diols. They are represented by the structural formula:

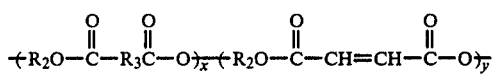

wherein $R_2$ and $R_3$ are alkylene or arylene radicals in the diol and saturated acid respectively, and x and y are variable numbers which depend upon the composition and condensation conditions. Polyester alkyds can be diluted to a fluid state with methacrylates or other vinyl monomers. These mixtures are capable of very rapid copolymerization to produce strong solids. This free-radical-initiated reaction proceeds via an addition mechanism involving the double bonds of both materials and leads to formation of a highly crosslinked structure.

The diol can be propylene glycol, dipropylene glycol, diethylene glycol, polypropylene glycol, polycaprolactone diol, butandiol polybutylene glycol or mixtures of glycols. When maleic anhydride is used, care must be paid to ensure isomerization of the maleate to fumarate. Maleate can be isomerized to fumarate catalytically or by the application of heat. However, use of isomerization catalysts can lead to crosslinking or other undesirable effects on the product. Fortunately, the polyesterification reaction is normally carried out at 200° C. or slightly higher, and at these temperatures isomerization is concurrent with polyesterification. Typical polyester cook times range from 6 to 16 hours at temperatures from 180° C. to as high as 230° C. Reaction temperatures much above 220° C. can be detrimental, leading to side reactions and poor color of the product.

Generally, substitution of fumarate for maleate as the unsaturated portion leads to higher flexural strength and modulus, higher hardness values, higher heat distortion temperatures and better chemical resistance in the cured systems. However, faster polymerization rates are also obtained. These differences can be equated to a higher crosslink density from the fumarate unsaturation.

Acid catalysts such as sulfuric acid or p-toluene-sulfonic acid increase the rate of both esterification and isomerization, but usually cause color formation and other detrimental side reactions. For this reason catalysts are generally not used in high-temperature reactions. However, metal salts or organometallic compounds are used as catalysts for direct esterification. Numerous metal salts have been used for catalyst action including, but not limited to, tetrabutyl or tetraoctyl titanate or zirconate or stannous oxalate in combination with sodium and zinc acetates.

The thermal initiators used herein for curing the reactive plasticizer are free radical initiators selected from substituted or unsubstituted pinacols, azo compounds, thiurams, organic peroxides and mixtures thereof.

The organic peroxides operable are of the general formula:

$$R-O-O-(R_1-O-O)_n-R$$

wherein n=0 or 1, R is independently selected from hydrogen, aryl, alkyl, aryl carbonyl, alkaryl carbonyl, aralkyl carbonyl and alkyl carbonyl and $R_1$ is alkyl or aryl, said alkyl groups containing 1 to 20 carbon atoms.

Examples of operable organic peroxides include, but are not limited to 2,5-dimethyl-2,5-di(t-butylperoxy)-hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane and di-t-butyl peroxide.

The organic peroxide is added to the composition in an amount ranging from 0.01–10%, preferably 0.1–5%, by weight based on the weight of the reactive plasticizer.

Examples of azo compounds operable herein include, but are not limited to, commercially available compounds such as 2-t-butylazo-2-cyanopropane; 2,2'-azo-bis-(2,4-dimethyl-4-methoxy-valeronitrile); 2,2'-azobis-(isobutyronitrile); 2,2'-azobis(2,4-dimethylvaleronitrile) and 1,1'-azobis(cyclohexanecarbonitrile).

The azo compound is added to the composition in an amount ranging from 0.001–5%, preferably 0.01–2% by weight based on the weight of the reactive plasticizer.

The thiurams operable as thermal initiators herein are of the formula

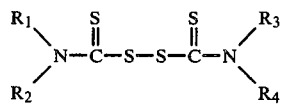

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_1$ and $R_2$ and $R_3$ and $R_4$ can each be a divalent alkylene group —$C_nH_{2n}$— having from 2 to about 12 carbon atoms, a divalent alkenylene group —$C_nH_{2n-2}$— group having from 3 to about 10 carbon atoms, a divalent alkadienylene group —$C_nH_{2n-4}$— having from 5 to about 10 carbon atoms, a divalent alkatrienylene group —$C_nH_{2n-6}$— having from 5 to about 10 carbon atoms, a divalent alkyleneoxyalkylene group —$C_xH_{2x}OC_xH_{2x}$— having a total of from 4 to about 12 carbon atoms or a divalent alkyleneaminoalkylene group:

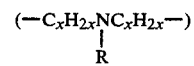

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The thiuram is added to the composition in an amount ranging from 0.005–5.0% by weight of the reactive plasticizer.

The substituted or unsubstituted pinacols operable herein as a thermal initiator have the general formula:

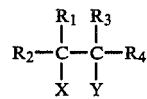

wherein $R_1$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

Preferred pinacols are those wherein $R_1$, $R_2$, $R_3$ and $R_4$ are aromatic radicals, especially phenyl radical and X and Y are hydroxyl.

Examples of this class of compounds include, but are not limited to, benzopinacol, 4,4'-dichlorobenzopinacol, 4, 4'-dibromobenzopinacol, 4,4'-diiodobenzopinacol, 4,4',4", 4'''-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-

3',4'-tetramethylbenzopinacol, 4,4'-dimethoxybenzopinacol, 4,4',4'',4'''-tetramethoxybenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol, fluorenonepinacol, acetophenonepinacol, 4,4'-dimethylacetophenone-pinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenonepinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-mono methylether, benzopinacol-mono-phenylether, benzopinacol and monoisopropyl ether, benzopinacol monoisobutyl ether, benzopinacol mono (diethoxy methyl) ether and the like.

The pinacol is added to the composition in amounts ranging from 0.01–10%, preferably 0.1–5%, by weight based on the weight of the reactive plasticizer.

In practicing the invention, it is sometimes possible to use a free radical initiator for curing the plasticizer which decomposes at a temperature lower than the fluxing temperature of the plastisol, especially when the composition is quickly heated to the fluxing temperature. This is due to the fact that the fluxing rate is much faster than the curing rate at the fluxing temperature. Thus, one can heat quickly to the fluxing temperature, flux the plastisol and cool down below the decomposition temperature of the thermal initiator before curing occurs, thereby obtaining a thermoplastic plastisol ready to be cured to a thermoset adhesive on reheating.

The heating step to cure the fluxed solid plastisol is usually carried out for a period of 10 seconds to 30 minutes at a temperature of 100°–300° C., preferably 120°–200° C. which is sufficient to fully cure the composition to a solid adhesive or sealant product.

The heating step using a thermal initiator to cure the adhesive plastisol resin composition can be accomplished in several ways. In simple systems, the adhesive composition can be applied by manual means to an adherend, contacted with another adherend and the assembled system heated in a forced air oven until a thermoset bond results.

Additionally and preferably, electromagnetic heating can be utilized as a faster and more efficient means of curing, especially where the substrates to be bonded are plastic materials. In addition to the formation of high strength bonds, electromagnetic bonding techniques aid in (a) fast bond setting times, and (b) automated part handling and assembly.

In practicing the instant invention, electromagnetic heating can be employed with the adhesive composition herein to adhere (1) plastic to plastic, (2) plastic to metal and (3) metal to metal. For example, dielectric heating can be used to bond (1) and (2) supra if the adhesive composition contains sufficient polar groups to heat the composition rapidly and allow it to bond the adherends. Inductive heating can also be used to bond (1), (2) and (3). That is, when at least one of the adherends is an electrically conductive or ferromagnetic metal, the heat generated therein is conveyed by conductance to the adhesive composition thereby initiating the cure to form a thermoset adhesive. In the instance where both adherends are plastic, it is necessary to add an energy absorbing material, i.e., an electrically conductive or ferromagnetic material, preferably in fiber or particle form (10–400 mesh) to the adhesive composition. The energy absorbing material is usually added in amounts ranging from 0.1 to 2 parts by weight, per 1 part by weight of the adhesive plastisol resin composition prior to fluxing. It is also possible to impregnate the plastic adherend at the bonding joint with particles of the energy absorbing material in order to use inductive heating, but care must be exercised that the plastic is not distorted.

The particulate electromagnetic energy absorbing material used in the adhesive composition when induction heating is employed can be one of the magnetizable metals including iron, cobalt and nickel or magnetizable alloys or oxides of nickel and iron and nickel and chromium and iron oxide. These metals and alloys have high Curie points (730°–2,040° F.).

Electrically conductive materials operable herein when inductive heating is employed include, but are not limited to, the noble metals, copper, aluminum, nickel, zinc as well as carbon black, graphite and inorganic oxides.

There are two forms of high frequency heating operable herein, the choice of which is determined by the material to be adhered. The major distinction is whether or not the material is a conductor or non-conductor of electrical current. If the material is a conductor, such as iron or steel, then the inductive method is used. If the material is an insulator, such as wood, paper, textiles, synthetic resins, rubber, etc., then dielectric heating can also be employed.

Most naturally occurring and synthetic polymers are non-conductors and, therefore, are suitable for dielectric heating. These polymers may contain a variety of dipoles and ions which orient in an electric field and rotate to maintain their alignment with the field when the field oscillates. The polar groups may be incorporated into the polymer backbone or can be pendant side groups, additives, extenders, pigments, etc. For example, as additives, lossy fillers such as carbon black at a one percent level can be used to increase the dielectric response of the plastisol adhesive. When the polarity of the electric field is reversed millions of times per second, the resulting high frequency of the polar units generates heat within the material.

The uniqueness of dielectric heating is in its uniformity, rapidity, specificity and efficiency. Most plastic heating processes such as conductive, convective or infrared heating are surface-heating processes which need to establish a temperature within the plastic by subsequently transfering the heat to the bulk of the plastic by conduction. Hence, heating of plastics by these methods is a relatively slow process with a non-uniform temperature resulting in overheating of the surfaces. By contrast, dielectric heating generates the heat within the material and is therefore uniform and rapid, eliminating the need for conductive heat transfer. In the dielectric heating system herein the electrical frequency of the electromagnetic field is in the range 1–3,000 megahertz, said field being generated from a power source of 0.5–1,000 kilowatts.

Induction heating is similar, but not identical, to dielectric heating. The following differences exist: (a) magnetic properties are substituted for dielectric properties; (b) a coil is employed to couple the load rather than electrodes or plates; and (c) induction heaters couple maximum current to the load. The generation of heat by induction operates through the rising and falling of a magnetic field around a conductor with each reversal of an alternating current source. The practical deployment of such field is generally accomplished by proper placement of a conductive coil. When another electrically conductive material is exposed to the field, induced current can be created. These induced currents can be in the form of random or "eddy" currents which result in the generation of heat. Materials which are both magnetizable and conductive generate heat more readily than materials which are only conductive. The heat generated as a result of the magnetic component is the result of hysteresis or work done in rotating magnetizable molecules and as a result of eddy current flow. Polyolefins and other plastics are neither magnetic nor conductive in their natural states. Therefore, they do not, in themselves, create heat as a result of induction.

The use of the eletromagnetic induction heating method for adhesive bonding of plastic structures has proved feasible by interposing selected eletromagnetic energy absorbing materials in an independent adhesive composition layer or gasket conforming to the surfaces to be bonded, electromagnetic energy passing through the adjacent plastic structures (free of such energy absorbing materials) is readily concentrated and absorbed in the adhesive composition by such energy absorbing materials thereby rapidly initiating cure of the adhesive plastisol composition to a thermoset adhesive.

Electromagnetic energy absorbing materials of various types have been used in the electromagnetic induction heating technique for some time. For instance, inorganic oxides and powdered metals have been incorporated in bond layers and subjected to electromagnetic radiation. In each instance, the type of energy source influences the selection of energy absorbing material. Where the energy absorbing material is comprised of finely divided particles having ferromagnetic properties and such particles are effectively insulated from each other by particle containing nonconducting matrix material, the heating effect is substantially confined to that resulting from the effects of hysteresis. Consequently, heating is limited to the "Curie" temperature of the ferromagnetic material or the temperature at which the magnetic properties of such material cease to exist.

The electromagnetic adhesive composition of this invention may take the form of an extruded ribbon or tape, a molded gasket or cast sheet. In liquid form it may be applied by brush to surfaces to be bonded or may be sprayed on or used as a dip coating for such surfaces.

The foregoing adhesive plastisol composition, when properly utilized as described hereinafter, results in a one component, solvent free bonding system which permits the joining of metal or plastic items without costly surface pretreatment. The electromagnetically induced bonding reaction occurs rapidly and is adaptable to automated fabrication techniques and equipment.

To accomplish the establishment of a concentrated and specifically located heat zone by induction heating for bonding in accordance with the invention, it has been found that the electromagnetic adhesive plastisol compositions described above can be activated and a bond created by an induction heating system operating with an electrical frequency of the electromagnetic field of from about 5 to about 30 megacycles and preferably from about 15 to 30 megacycles, said field being generated from a power source of from about 1 to about 30 kilowatts, and preferably from about 2 to about 5 kilowatts. The electromagnetic field is applied to the articles to be bonded for a period of time of less than about 2 minutes.

As heretofore mentioned, the electromagnetic induction bonding system and improved electromagnetic adhesive compositions of the present invention are applicable to the bonding of metals, thermoplastic and thermoset material, including fiber reinforced thermoset material.

In practicing the instant invention the fluxed plastisol composition can also be subjected to UV radiation to obtain a thermoset material. It preferably is necessary to add known photoinitiators in order to initiate the UV reaction. Preferred photoinitiators are the aldehyde and ketone carbonyl compounds having at least one aromatic nucleous attached directly to the

group. Various photoinitiators include, but are not limited to, benzophenone, acetophenone, o-methoxybenzophenone, acenapthene-quinone, methyl ethyl ketone, valerophenone, hexanophenone, alpha-phenyl-butyrophenone, p-morpholinopropionphenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthrene-9-one, 7-H-benz[de]anthracen-7-one, 1-naphthaldehyde, 4,4'-bis(dimethylamino)benzophenone, fluorene-9-one, 1'-acetonaphthone, 2'-acetonaphthone, 2,3-butanedione, triphenylphosphine, tri-o-tolylphosphine, acetonaphthone, 2,3-butanedione, benz[a]anthracene 7.12 dione, etc. Another class of photoinitiators is the benzoin ethers, such as benzoin methyl ether, benzoin ethyl ether, benzoin isopropyl ether and benzoin isobutyl ether. Still another class of photoinitiators are the dialkoxyacetophenones exemplified by 2,2-dimethoxy-2-phenylacetophenone and 2,2-diethoxy-2-phenylacetophenone. Benzil ketals such as benzil dimethyl ketals are also operable herein as photoinitiators. The photoinitiators or mixtures thereof are usually added in an amount ranging from 0.0005 to 30% by weight of the plasticizer.

A class of actinic light useful herein for curing is ultraviolet light and other forms of actinic radiation which are normally found in radiation emitted from the sun or from artificial sources such as Type RS sunlamps, carbon arc lamps, xenon arc lamps, mercury vapor lamps, tungsten halide lamps and the like. Ultraviolet radiation may be used most efficiently if the photocurable composition contains a suitable photoinitiator. Curing periods may be adjusted to be very short and hence commercially economical by proper choice of ultraviolet source, photoinitiator and concentration thereof, temperature and molecular weight and reactive group functionality of the plasticizer. Curing periods of about 1 second duration are possible, especially in thin film applications such as desired, for example, in coatings, adhesives and photoimages surfaces.

When UV radiation is used, an intensity of 0.0004 to 60.0 watts/cm$^2$ in the 200–400 nanometer region is usually employed. High energy ionizing radiation can also be used for the curing step without the use of photoinitiators in the instant invention. If high energy ionizing irradiation is used, e.g., electron beam, a dose in the range of 0.01–10 megarads is employed at a dose rate of $1.0 \times 10^4$–4,000 megarads/second. Any radiation having an energy of greater than 3.0 electron volts is operable to cause the curing reaction of the instant invention.

The following examples will help to explain, but expressly not limit, the instant invention. Unless otherwise noted, all parts and percentages are by weight.

The lap shear strengths of the adhesives were measured on an Instron Tensile Tester using the method set out in ASTM D-1002.

EXAMPLE 1

Preparation of Polyester Plasticizer

To 0.1 mole of polypropylene glycol (MW=725 g/mole) was charged 0.2 mole of maleic anhydride and 0.9 g of triethylamine. The mixture was stirred at 130° C. for 16 hours and then cooled to 40° C. To this reaction mixture were added 50 ml of methanol and refluxed for 8 hours. Gradually, methanol was removed under reduced pressure and the temperature was increased to 135° C. and maintained at 135° C. for 4 hours. The unsaturated polyester plasticizer product was yellow viscous liquid.

EXAMPLE 2

3.5 g of polyvinyl butyral (Butvar B-72, commercially available from Monsanto) were dispersed in 7.0 g of liquid resin from Example 1. After adding 0.2 g of benzopinacol, the dispersion was spread on an aluminum plate and heated at 120° C. to give a wet, clear rubbery film. The dispersion can be cured to give a flexible film in the absence of air at 150° C.

EXAMPLE 3

3.5 g of polyvinyl butyral (Butvar B-72) were dispersed in 7.0 g of a resin mixture composed of 50% of resin from Example 1, 25% of tetraethylene glycol dimethacrylate and 25% of methacrylate of diglycidyl ether of bisphenol A. After adding 0.2 g of benzopinacol, the dispersion was applied between two fiber reinforced polyester plates (SMC) having 1 in₂ of overlapping area. After curing at 150° C. for 10 minutes, the fluxed, cured plastisol provided substrate failure to the SMC.

EXAMPLE 4

33.3 g of a polyvinyl formal resin thermoplast in particle form having a molecular weight in the range 24,000–40,000 and a polyvinyl formal content of 82%, commercially available from Monsanto under the tradename "Formvar 15/95 E", were admixed with 66.7 g of commercially available tetraethylene glycol dimethacrylate liquid plasticizer and 1 g of benzopinacol by hand at room temperature. The admixture was heated at 150° C. for 10 minutes. A fluxed, cured, clear product resulted.

A separate portion of the admixture was placed between two glass fiber reinforced (SMC) substrates to make a 1″ adhesive overlap. The substrates with the adhesive therebetween were placed in an oven for 10 minutes at 150° C. to flux and cure the adhesive. After removing the adhered substrates from the oven and cooling to room temperature, the bond was tested for lap shear strength. The bond resulted in substrate failure indicating that a strong adhesive bond was formed by the material.

EXAMPLE 5

100 g of a bisphenol-A epoxy methacrylate, commercially available from Shell Chemical Co. under the tradename "EPOCRYL-12", and 100 g of commercially available tetraethylene glycol dimethacrylate were charged to a 500 ml resin kettle and stirred for 2 days to form a liquid plasticizer. 84 g of the plasticizer admixture were admixed with 36.0 g of a polyvinyl formal thermoplast in particle form, commercially available from Monsanto under the tradename "Formvar 15-95 E" in a blender. A portion of this blended material was placed on a Mylar film and heated to 100° C. for 5 minutes. A clear, fluxed, rubbery film of the plastisol was removed from the Mylar.

The blended material was also used as an adhesive between samples of glass fiber reinforced (SMC) substrates (1″ overlap) and also between steel substrates in a ½″ overlap. The adhesive containing substrate samples were cured at 150° C. for 5 minutes. The 5 steel samples had a mean lap strength of 398.8 psi. and a mean impact strength of 21.6 in.-lb. and a lap shear strength of 70.9 psi. and an impact strength of 11.8 in.-lb. on the glass fiber reinforced substrates.

EXAMPLE 6

10 g of a polyvinyl formal thermoplast in particle form (Formvar 5/95E, commercially available from Monsanto) was dispersed in a reactive plasticizer mixture containing 10 g of tetraethylene glycol dimethacrylate, 10 g of Epocryl-12 and 0.4 g of 2,2-diethoxy-2-phenylacetophenone as a photoinitiator. The dispersion was heated at 120° C. for 5 minutes to form a fluxed, rubbery film which was cured under UV light for 2 minutes. The photocuring was carried out in a chamber having a Sylvania medium pressure mercury lamp power =60 watt/in. in a parabolic reflector. A thermoset film resulted.

EXAMPLE 7

10 g of polyvinyl formal was dispersed in a reactive plasticizer mixture containing 10 g of the unsaturated polyester from Example 1, 5 g of tretraethylene glycol dimethacrylate, 5 g of Epocryl-12 and 0.4 g of 2,2-diethoxy-2-phenylacetophenone as a photoinitiator. Following the fluxing and curing processes of Example 6, a thermoset film resulted.

I claim:

1. The process of adhering two substrates which comprises applying therebetween a reactive plastisol dispersion consisting of
   (1) a polyvinyl acetal thermoplast in particle form having a particle size in the range from about 0.1 to about 1,500 microns and
   (2) a liquid plasticizer member of the group consisting of
      (a) at least one ethylenically unsaturated monomer, oligomer or prepolymer of the formula:

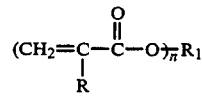

wherein R is H or CH$_3$, R$_1$ is an organic moiety and n is 1 or more, (b) at least one unsaturated polyester containing the group:

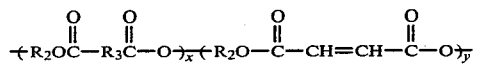

wherein R$_2$ and R$_3$ are organic moieties, x is 0-20 and y is 1-20, and (c) a mixture of (a) and (b), said liquid plasticizer being present in an amount ranging from 50 to 2,000 parts per 100 parts of the thermoplast by weight, and, thereafter, heating said dispersion to a temperature in the range 100°-300° C. for a time sufficient to cause the dispersion to flux and become thermoset.

2. The process according to claim 1 wherein the adhesive dispersion includes a free radical thermal initiator.

3. The process of claim 2 wherein the free radical thermal initiator is a member of the group consisting of substituted or unsubstituted pinacols, azo compounds, thiurams, organic peroxides and mixtures thereof.

4. The process of claim 3 wherein the initiator is benzopinacol.

5. The process of claim 1 wherein the polyvinyl acetal is polyvinyl formal.

6. The process of claim 1 wherein the polyvinyl acetal is polyvinyl butyral.

7. The process of claim 1 wherein the thermoplast is polyvinyl formal and the plasticizer is (b).

8. The process of claim 1 wherein the thermoplast is polyvinyl formal and the plasticizer is (a).

* * * * *